(12) United States Patent
Tsukamoto

(10) Patent No.: US 12,119,773 B2
(45) Date of Patent: Oct. 15, 2024

(54) POWER SUPPLY SYSTEM AND METHOD FOR CONTROLLING POWER SUPPLY SYSTEM

(71) Applicants: NISSAN MOTOR CO., LTD., Yokohama (JP); AMPERE S.A.S., Boulogne-Billancourt (FR)

(72) Inventor: Yukinori Tsukamoto, Kanagawa (JP)

(73) Assignees: NISSAN MOTOR CO., LTD., Yokohama (JP); AMPERE S.A.S., Boulogne-Billancourt (FR)

( * ) Notice: Subject to any disclaimer, the term of this patent is extended or adjusted under 35 U.S.C. 154(b) by 0 days.

(21) Appl. No.: 17/927,483

(22) PCT Filed: May 28, 2020

(86) PCT No.: PCT/IB2020/000512
§ 371 (c)(1),
(2) Date: Nov. 23, 2022

(87) PCT Pub. No.: WO2021/240190
PCT Pub. Date: Dec. 2, 2021

(65) Prior Publication Data
US 2023/0216437 A1    Jul. 6, 2023

(51) Int. Cl.
*B60L 3/04*      (2006.01)
*B60L 50/60*     (2019.01)
(Continued)

(52) U.S. Cl.
CPC .................. *H02P 5/74* (2013.01); *B60L 3/04* (2013.01); *B60L 50/60* (2019.02); *H02M 7/53871* (2013.01); *B60L 2210/10* (2013.01)

(58) Field of Classification Search
CPC .... H02P 5/74; B60L 3/04; B60L 50/60; B60L 2210/10; B60L 58/20; B60L 1/00; H02M 7/53871; H02M 7/5387; Y02T 10/72
(Continued)

(56) References Cited

U.S. PATENT DOCUMENTS

2015/0034406 A1*   2/2015   Hirose .................... B60L 7/14
                                                          180/279
2019/0168613 A1    6/2019   Takegawa et al.

FOREIGN PATENT DOCUMENTS

EP       3 616 973 A1     3/2020
JP       2014-135873 A    7/2014
(Continued)

*Primary Examiner* — Rexford N Barnie
*Assistant Examiner* — Xuan Ly
(74) *Attorney, Agent, or Firm* — Foley & Lardner LLP (57) ABSTRACT

A power source system mounted in a vehicle includes: a first power source (2); a first load (41) operated by electric power supplied from the first power source (2); a first controller (9) that controls an operation of the first load (41) by a first program; a second power source (8) connected to the first power source (2) via a converter (7); a second load (11) operated by electric power supplied from the second power source (8); a second controller (10) that controls an operation of the second load (11) by a second program; an electric power disconnecting device (3) that connects or disconnects between the first power source (2) and the first load (41); and a third controller (12) that controls the electric power disconnecting device (3). When the first program is changed, the third controller (12) disconnects the first power source (2) from the first load (41) by the electric power disconnecting device (3) before a change process of the first program is started.

5 Claims, 4 Drawing Sheets

(51) Int. Cl.
*H02M 7/5387* (2007.01)
*H02P 5/74* (2006.01)

(58) Field of Classification Search
USPC .......................................................... 307/9.1
See application file for complete search history.

(56) References Cited

FOREIGN PATENT DOCUMENTS

| | | | |
|---|---|---|---|
| JP | 2019-064424 A | | 4/2019 |
| JP | 2019064424 | * | 4/2019 |
| JP | 2020-031516 A | | 2/2020 |
| JP | 3616973 | * | 4/2020 |
| WO | WO-2013/125010 A1 | | 8/2013 |

* cited by examiner

POWER SUPPLY SYSTEM AND METHOD FOR CONTROLLING POWER SUPPLY SYSTEM

TECHNICAL FIELD

The present invention relates to a power source system and a control method for the power source system.

BACKGROUND ART

There has been known a power source system mounted in a vehicle (for example, Patent Document 1). This power source system includes a secondary battery, a motor-generator and a voltage converter connected in parallel to the secondary battery, and an auxiliary battery connected to the secondary battery via the voltage converter. The secondary battery discharges electric power when the motor-generator functions as an electric motor, and is charged when the motor-generator functions as an electric generator. The voltage converter steps down a voltage of the secondary battery, and outputs the stepped down voltage to the auxiliary battery. The auxiliary battery supplies electric power to a load of an auxiliary system mounted in the vehicle.
Patent Document 1: JP-A-2014-135873

DISCLOSURE OF THE INVENTION

Problems to be Solved by the Invention

In the power source system disclosed in Patent Document 1, the operation of the motor-generator or the load of the auxiliary machine system is controlled by a program in some cases. During a rewrite of the control program, it is difficult to normally control an object to be controlled by the program. In the power source system disclosed in Patent Document 1, there is a problem that since the secondary battery is electrically connected with the motor-generator during the rewrite of the program, an unanticipated behavior occurs in the control target of the program.

An object of the present invention is to provide a power source system capable of suppressing an occurrence of an unanticipated behavior in a control target of a program during a rewrite of the program, and a control method for the power source system.

Solutions to the Problems

The present invention includes: a first power source; a first load operated by electric power supplied from the first power source; a first controller that controls an operation of the first load by a first program; a second power source connected to the first power source via a converter; a second load operated by electric power supplied from the second power source; a second controller that controls an operation of the second load by a second program; an electric power disconnecting device that connects or disconnects between the first power source and the first load; and a third controller that controls the electric power disconnecting device. Then, in the present invention, when the first program is changed, the third controller disconnects the first power source from the first load by the electric power disconnecting device before a change process of the first program is started, thereby solving the above-described problem.

Effects of the Invention

According to the present invention, since the first power source is disconnected from the first load before the change process of the first program is started, it can be suppressed that an unanticipated behavior occurs in a control target of a program during a rewrite of the program.

DESCRIPTION OF PREFERRED EMBODIMENTS

Embodiments of the present invention will be described below with reference to the drawings.

First Embodiment

Figure 1:
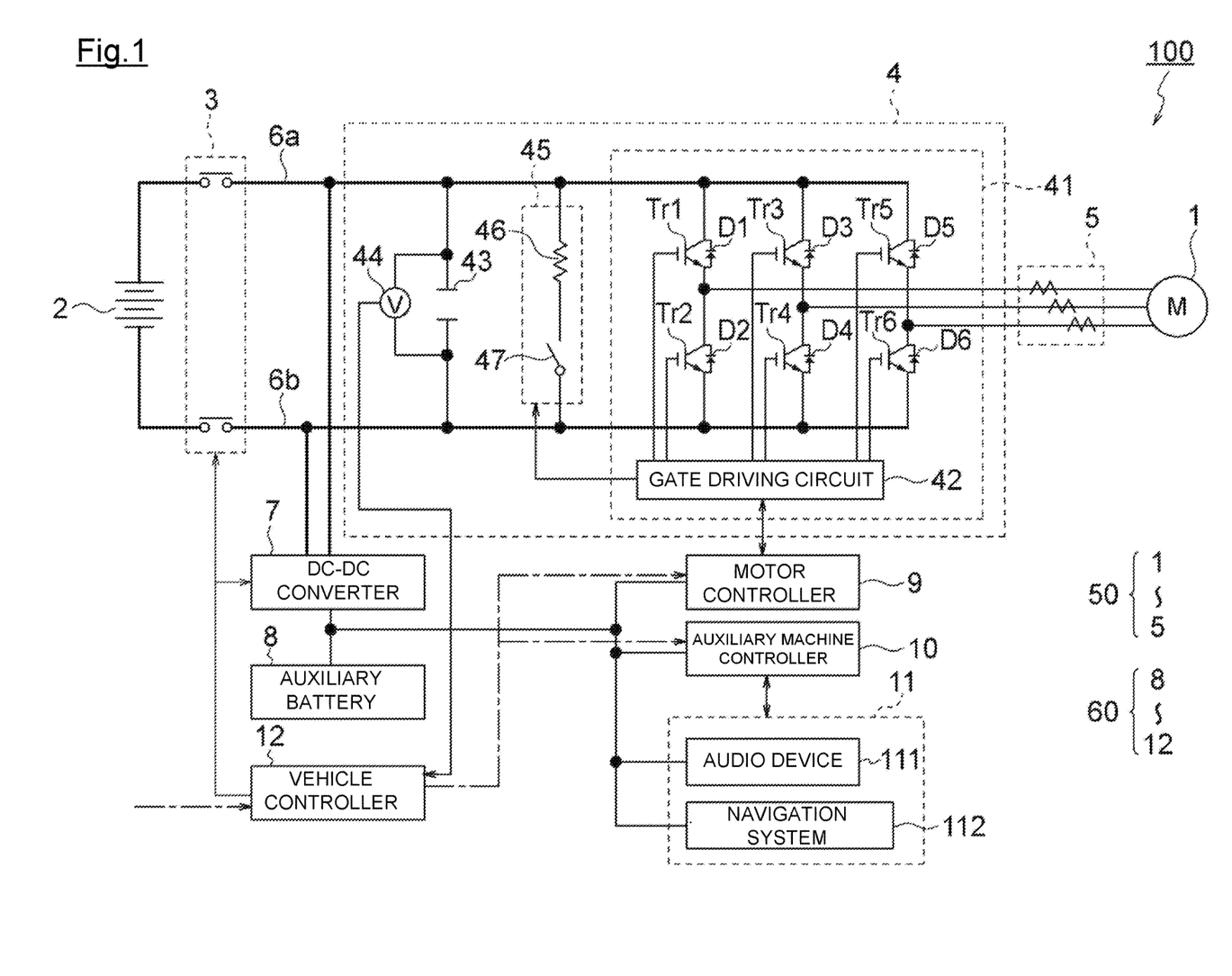
FIG. 1 is a block diagram of a power source system according to a first embodiment.

FIG. 1 is a block diagram of a power source system 100 according to the first embodiment when the power source system 100 is mounted in an electric-powered vehicle. As the electric-powered vehicle, for example, an electric vehicle with a motor 1 as a traveling driving source is included. In the example of FIG. 1, the motor 1 is coupled to an axle (not illustrated) of the electric-powered vehicle, and driven by electric power of a battery 2. The electric-powered vehicle in which the power source system 100 can be mounted is not limited to the electric vehicle. The power source system 100 can be mounted in a hybrid vehicle with both the motor 1 and an internal combustion engine (not illustrated) as the traveling driving source. Hereinafter, for convenience of description, the electric-powered vehicle is simply referred to as a vehicle.

As illustrated in FIG. 1, the power source system 100 includes two types of electric power systems different in height of voltage. An electric power system 50 is an electric power system configured of, for example, equipment operated by a voltage of the battery 2. An electric power system 60 is an electric power system configured of, for example, equipment operated by a voltage lower than that of the electric power system 50, that is, a voltage lower than the voltage of the battery 2. Hereinafter, the electric power system 50 is referred to as a high-voltage electric power system 50, and the electric power system 60 is also referred to as a low-voltage electric power system 60.

The high-voltage electric power system 50 includes the motor 1, the battery 2, a relay 3, a power converter 4, and a current sensor 5.

The motor 1 is what is called a three phase induction motor. The motor 1 is also referred to as a three phase motor. The motor 1 includes coils of three phases (U-phase, V-phase, W-phase). As illustrated in FIG. 1, the coils of the respective phases of the motor 1 are connected to the power converter 4. The current sensor 5 is disposed on the wirings connecting between the coils of the respective phases of the motor 1 and the power converter 4. The current sensor 5 detects each of phase currents output from the power converter 4 to the motor 1. Values of the respective phase currents detected by the current sensor 5 are output to a motor controller 9. Although not illustrated in FIG. 1, the motor 1 includes an angular sensor such as a resolver or an encoder, and position information of a rotor of the motor 1 detected by the angular sensor is output to the motor controller 9.

The battery 2 is a direct current power source, and is a driving power source of the vehicle of this embodiment. For example, as the battery 2, a secondary battery such as a lithium-ion battery is used. The battery 2 is a direct current power source of what is called a high power system that discharges at a direct current voltage of several hundred volts (V). The power converter 4 includes an inverter 41 as a device that can be operated by the voltage of the battery 2 as described later. In the description below, the inverter 41 may be referred to as high power equipment in other words. In the description below, the battery 2 may be referred to as a high power battery 2 in other words.

The relay 3 is a device driven to open and close by a vehicle controller 12 described later. The battery 2 is connected to the power converter 4 via the relay 3. The battery 2 is connected to a DC-DC converter 7 via the relay 3.

The relay 3 is disposed between the battery 2 and the power converter 4, and connects or disconnects between the battery 2 and the power converter 4. The relay 3 is disposed between the battery 2 and the DC-DC converter 7, and connects or disconnects between the battery 2 and the DC-DC converter 7. As the relay 3, for example, a mechanical relay is included. A semiconductor switching element may be used for the relay 3.

As illustrated in the example of FIG. 1, when the power converter 4 and the DC-DC converter 7 are connected in parallel to the battery 2, it is not often that a relay for the power converter 4 and a relay for the DC-DC converter 7 are separately disposed. Typically, as illustrated in the example of FIG. 1, the relay 3 is disposed between the battery 2 and the power converter 4 and the DC-DC converter 7. In this embodiment, closing the relay 3 is synonymous with turning on the relay 3. Opening the relay 3 is synonymous with turning off the relay 3.

The power converter 4 performs a power conversion between the motor 1 and the battery 2. As illustrated in FIG. 1, the power converter 4 includes the inverter 41, a capacitor 43, a voltage sensor 44, and a discharge circuit 45.

The inverter 41 is operated by electric power supplied from the battery 2. The inverter 41 includes a plurality of switching elements Tr1 to Tr6, a plurality of rectifier elements D1 to D6, and a gate driving circuit 42. For the plurality of switching elements Tr1 to Tr6, for example, insulated gate bipolar transistors (IGBTs) are used. The plurality of switching elements Tr1 to Tr6 are not necessarily the IGBTs, and metal-oxide semiconductor field-effect transistors (MOSFETs) may be used. In this embodiment, a case where IGBTs are used for the plurality of switching elements Tr1 to Tr6 is described as an example.

In the inverter 41, an emitter electrode of the switching element Tr1 is connected to a collector electrode of the switching element Tr2, and an arm circuit is formed by the switching element Tr1 and the switching element Tr2. A connection point of the switching element Tr1 and the switching element Tr2 is connected to the coil (not illustrated) of the U-phase of the motor 1. The rectifier element D1 is connected in parallel to the switching element Tr1 such that a current flows in a direction opposite to a current direction of the switching element Tr1. The rectifier element D2 is connected in parallel to the switching element Tr2 such that a current flows in a direction opposite to a current direction of the switching element Tr2. The rectifier element D1 and the rectifier element D2 are reflux diodes.

As illustrated in FIG. 1, in the inverter 41, an arm circuit is formed by the switching element Tr3 and the switching element Tr4, and an arm circuit is formed by the switching element Tr5 and the switching element Tr6. The three arm circuits illustrated in FIG. 1 is disposed corresponding to the respective phases of the motor 1, and connected in parallel between a power supply bus 6a and a power supply bus 6b. Since the arm circuit formed by the switching element Tr3 and the switching element Tr4 and the arm circuit formed by the switching element Tr5 and the switching element Tr6 have circuit configurations similar to that of the arm circuit formed by the switching element Tr1 and the switching element Tr2, the above description is employed for the circuit configurations.

Each of gate electrodes of the plurality of switching elements Tr1 to Tr6 is connected to the gate driving circuit 42. The plurality of switching elements Tr1 to Tr6 are turned on or off in response to a gate control signal output from the gate driving circuit 42.

The gate driving circuit 42 outputs the gate control signal to the gate electrodes of the plurality of switching elements Tr1 to Tr6 to turn on or off each of the switching elements. A PWM signal (Pulse Width Modulation signal) is input from the motor controller 13 to the gate driving circuit 42. The gate driving circuit 42 includes a circuit of a level shifter configured to shift the input voltage to be higher. The gate driving circuit 42 shifts the level of the voltage of the PWM signal up to a voltage capable of turning on or off the plurality of switching elements Tr1 to Tr6. The gate driving circuit 42 shifts the level of the voltage of the PWM signal generated by the motor controller 13, and outputs it to the gate electrodes of the respective switching elements. Accordingly, each of the switching elements of the inverter 41 turns on or off.

The capacitor 43 is connected between the power supply bus 6a and the power supply bus 6b. The capacitor 43 is disposed to smooth the electric power output from the battery 2. The voltage sensor 44 is connected in parallel to the capacitor 43. The voltage sensor 44 detects the voltage between both terminals of the capacitor 43.

The discharge circuit 45 is connected between the power supply bus 6a and the power supply bus 6b. The discharge circuit 45 is configured of a series circuit of a discharge resistor 46 and a switching element 47. For the switching element 47, for example, an IGBT, a MOSFET, or the like is used. In this embodiment, a control signal is input from the gate driving circuit 42 to the switching element 47. The switching element 47 turns on or off in response to the control signal input from the gate driving circuit 42.

Next, the low-voltage electric power system 70 will be described. As illustrated in FIG. 1, the battery 2 is connected to an auxiliary battery 8 via the DC-DC converter 7. The DC-DC converter 7 is a voltage converter that steps down the voltage of the battery 2. An input terminal of the DC-DC converter 7 is connected to the battery 2. An output terminal of the DC-DC converter 7 is connected to the auxiliary battery 8, the motor controller 9, an auxiliary machine controller 10, an auxiliary machine 11, and a vehicle controller 12.

The DC-DC converter 7 outputs the stepped down voltage of the battery 2 to the auxiliary battery 8, the motor controller 9, the auxiliary machine controller 10, the auxiliary machine 11, and the vehicle controller 12. The auxiliary battery 8 is charged by the voltage output from the DC-DC converter 7. A circuit configuration and a control mechanism known at the time of the filing of this application are applicable to the DC-DC converter 7.

The auxiliary battery 8 is a direct current power source, and a driving source for driving the motor controller 9, the auxiliary machine controller 10, the auxiliary machine 11, and the vehicle controller 12. For the auxiliary battery 8, a secondary battery such as a lithium-ion battery is used. The auxiliary battery 8 is a direct current power source of what is called a low power system that discharges at a direct current voltage in a range of from a dozen volts (V) to several dozen volts (V). The motor controller 9, the auxiliary machine controller 10, the auxiliary machine 11, and the vehicle controller 12 are devices that can be operated by the voltage of the auxiliary battery 8. In the description below, these devices may be referred to as low power equipment in other words. In the description below, the auxiliary battery 8 may be referred to as a low power battery 8 in other words. Although not illustrated in FIG. 1, a current sensor that detects a current flowing in the auxiliary battery 8 is disposed in the auxiliary battery 8. A value of the current of the auxiliary battery 8 detected by the current sensor is output to the vehicle controller 12.

The motor controller 9 is a computer for controlling the operation of the motor 1. Specifically, the motor controller 9 drives the plurality of switching elements Tr1 to Tr6 constituting the inverter 41, thereby controlling the operation of the motor 1. For example, the motor controller 9 includes a ROM (Read Only Memory) that stores a program for controlling the operation of the motor 1, a CPU (Central Processing Unit) that executes the program stored in the ROM, and a RAM (Random Access Memory) that functions as an accessible storage device. The motor controller 9 generates the PWM signal based on a torque command value input from the vehicle controller 12, position information of the rotor input from the angular sensor disposed in the motor 1, and a current value input from the current sensor 5. The motor controller 9 outputs the PWM signal to the gate driving circuit 42. Accordingly, the inverter 41 performs an operation corresponding to a power running or a regeneration of the motor 1. Specifically, when the motor 1 performs the power running operation, the inverter 41 converts the direct current voltage output from the battery 2 into an alternating current voltage. Meanwhile, when the motor 1 performs the regeneration operation, the inverter 41 converts the alternating current voltage generated by the motor 1 into a direct current voltage.

The motor controller 9 executes the program stored in the ROM, thereby controlling the inverter 41 as described above. The program stored in the ROM of the motor controller 9 is changed by the vehicle controller 12 described later. Specifically, the vehicle controller 12 writes the program in which the change has been made in the ROM of the motor controller 9.

Changing the program includes updating the program (program update). Additionally, since changing the program is also referred to as reprogramming, or Repro (abbreviated name of reprogramming), in the description below, for the program of the motor controller 9, "changing the program" may be referred to as the "reprogramming" or the "Repro" in other words. In the description below, for convenience of description, the program in which the change has been made is referred to as a "changed program."

The auxiliary machine controller 10 is a computer for controlling the operation of the auxiliary machine 11. For example, the auxiliary machine controller 10 includes a ROM that stores a program for controlling the operation of the auxiliary machine 11, a CPU that executes the program stored in the ROM, and a RAM that functions as an accessible storage device.

As illustrated in FIG. 1, as the auxiliary machine 11, for example, an audio device 111 and a navigation system 112 are included. The audio device 111 outputs music and the like in a vehicle interior in response to the operation of a vehicle occupant. The navigation system 112 indicates a route from a current position to a destination of the vehicle based on information on the current position of the vehicle, and guides the vehicle occupant. The audio device 111 and the navigation system 112 illustrated in FIG. 1 are examples of the auxiliary machine 11, and do not limit the auxiliary machine 11. The auxiliary machine 11 may include another device or system insofar as the device or system can be operated by the voltage of the auxiliary battery 8. In the description below, the auxiliary machine 11 may be referred to as low power equipment in other words.

The auxiliary machine controller 10 executes the program stored in the ROM, thereby controlling the operations of the audio device 111 and the navigation system 112. The program stored in the ROM of the auxiliary machine controller 10 is also changed by the vehicle controller 12 described later similarly to the motor controller 9. Specifically, the vehicle controller 12 writes the changed program in the ROM of the auxiliary machine controller 10.

For the program of the auxiliary machine controller 10 as well, similarly to the motor controller 9, in the description below, "changing the program" may be referred to as the "reprogramming" or the "Repro" in other words. Similarly to the motor controller 9, for the auxiliary machine controller 10 as well, the program in which the change has been made is referred to as a "changed program" in the description.

The vehicle controller 12 is configured of a computer including hardware and software. The vehicle controller 12 includes a ROM that stores a program, a CPU that executes the program stored in the ROM, and a RAM that functions as an accessible storage device. As an operation circuit, instead of or together with the CPU, an MPU (Micro Processing Unit), a DSP (Digital Signal Processor), an ASIC (Application Specific Integrated Circuit), an FPGA (Field Programmable Gate Array), and the like are usable.

The vehicle controller 12 is connected to the motor controller 9 and the auxiliary machine controller 10 by CAN (Controller Area Network) or another vehicle LAN for mutually transmitting and receiving information with the motor controller 9 and the auxiliary machine controller 10. The vehicle controller 12 is also connected to a communication controller (not illustrated) disposed in the vehicle by CAN or another vehicle LAN. The communication controller is a computer for controlling a communication device disposed in the vehicle. The CAN or another vehicle LAN is referred to as an in-vehicle network. In this embodiment, information on the programs of the motor controller 9 and the auxiliary machine controller 10 is transmitted and received between the controllers.

The vehicle controller 12 executes the program stored in the ROM, thereby achieving a converter control function, a relay control function, a discharge control function, and a program change function. The functions provided to the vehicle controller 12 will be each described below.

The vehicle controller 12 controls the operation of the DC-DC converter 7 by the converter control function. Specifically, the vehicle controller 12 operates the DC-DC converter 7 to charge the auxiliary battery 8 depending on the charge amount of the auxiliary battery 8. For the control method of charging the auxiliary battery 8, a control method known at the time of the filing of this application is applicable to the vehicle controller 12.

The vehicle controller 12 controls the operation of the discharge circuit 45 by the discharge control function. In this embodiment, the vehicle controller 12 outputs a command to operate the switching element 47 to the motor controller 9, thereby turning on or off the switching element 47.

For example, when the switching element 47 is turned on by the command of the vehicle controller 12, the power supply bus 6a is connected to the power supply bus 6b via the discharge resistor 46. That is, the vehicle controller 12 can start discharging the electric charge accumulated in the capacitor 43. When the switching element 47 is tuned on once, and then the switching element 47 is tuned off by the command of the vehicle controller 12, the power supply bus 6a is disconnected from the power supply bus 6b and becomes disconnection state. That is, the vehicle controller 12 can stop the discharge of the electric charge accumulated in the capacitor 43.

The vehicle controller 12 changes at least any one of the program of the motor controller 9 and the program of the auxiliary machine controller 10 by the program change function.

The change process of the program of the motor controller 9 and the program of the auxiliary machine controller 10 is started by, for example, a command from a server disposed outside the vehicle. The program change process of the server includes, for example, a process in which the server transmits a request signal for requesting the change of the program to the vehicle, and then transmits a changed program.

For example, first, a request signal for requesting the change of the program is input to the vehicle controller 12 via the in-vehicle network. Next, a changed program corresponding to the request signal is input to the vehicle controller 12. The vehicle controller 12 can determine which controller the request signal is a signal for requesting the change on the program of. When the auxiliary machine controller 10 controls a plurality of auxiliary machines 11, the vehicle controller 12 can determine which auxiliary machine, among the plurality of auxiliary machines 11, the request signal is a request signal on the program for controlling. When a plurality of changed programs are input to the vehicle controller 12, the vehicle controller 12 can determine which controller the changed program is the program of.

When the changed program is input, the vehicle controller 12 executes a program rewrite process by the changed program to the ROM included in the controller as a change target (motor controller 9, auxiliary machine controller 10). Thus, the program stored in the ROM of the motor controller 9 or the ROM of the auxiliary machine controller 10 is changed. In other words, the program of the motor controller 9 or the program of the auxiliary machine controller 10 is reprogrammed.

In this embodiment, in a case where at least any of the program of the motor controller 9 and the program of the auxiliary machine controller 10 is changed, the vehicle controller 12 controls the relay 3, and controls the discharge circuit 45. The case where the relay 3 and the discharge circuit 45 are controlled by the vehicle controller 12 may be a case other than the case where the program of the motor controller 9 or the program of the auxiliary machine controller 10 is changed. For example, the vehicle controller 12 may control the relay 3 and the discharge circuit 45 also in a case where an ignition switch of an electric-powered vehicle is switched from off to on by an operation of a vehicle occupant. For the control of the relay 3 and the discharge circuit 45 in such a case, a control technique known at the time of the filing of this application is applicable to the vehicle controller 12.

Figure 2:
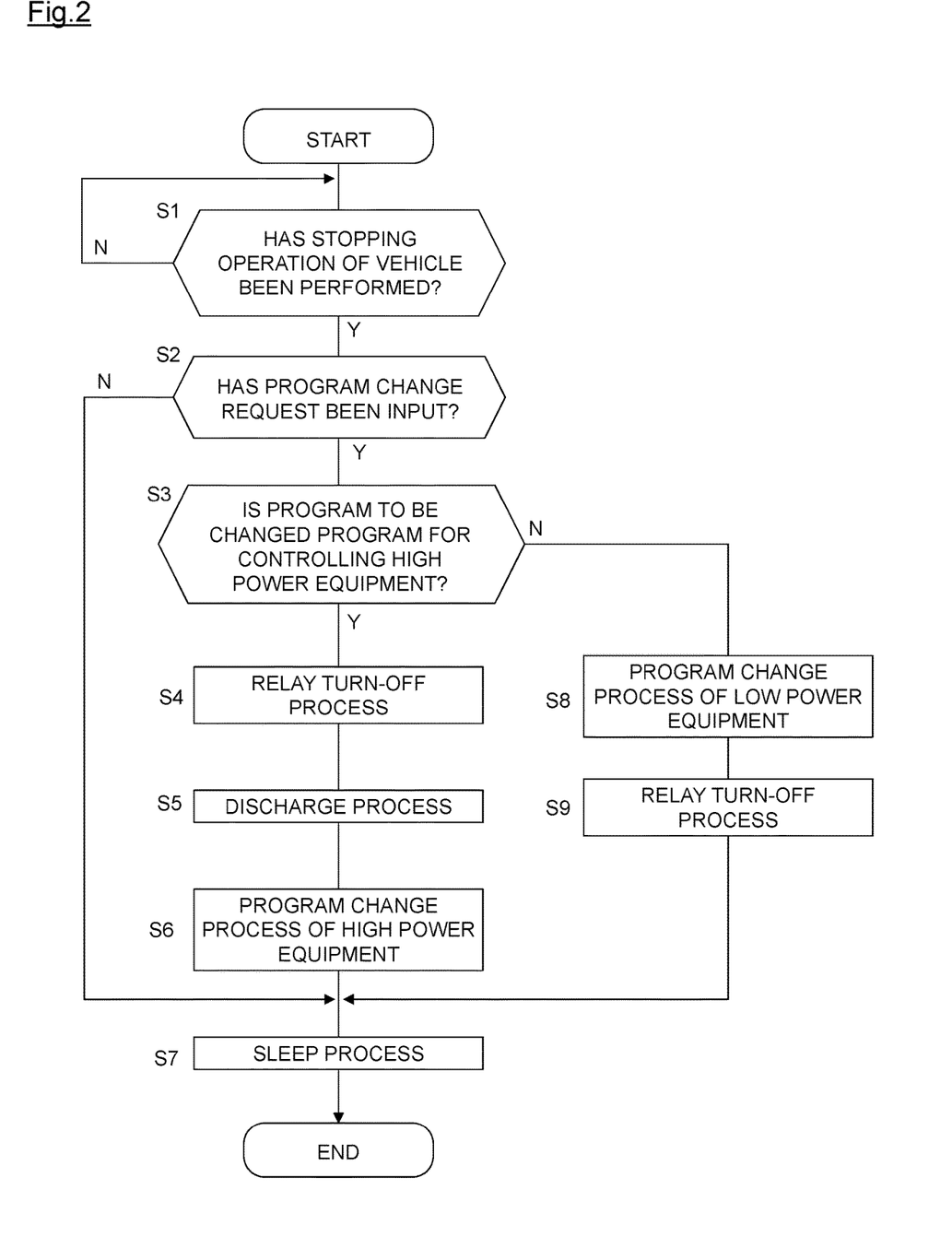
FIG. 2 is a flowchart illustrating a control process executed by a vehicle controller in the power source system according to the first embodiment.

FIG. 2 is a flowchart illustrating a control process executed by the vehicle controller 12 in the power source system 100. In a state of the power source system 100 before the start of Step S1 illustrated in FIG. 2, it is assumed that the relay 3 is on, and the switching element 47 of the discharge circuit 45 is off.

In Step S1, the vehicle controller 12 determines whether a stopping operation of the vehicle has been performed by an occupant (driver) or not. For example, when a signal indicating that the ignition switch is off is input to the vehicle controller 12, the vehicle controller 12 can determine that the vehicle is in a stopped state. This step is a step for determining whether the state of the vehicle is in a state where the change process of the program below is executable or not. When the stopping operation of the vehicle is determined to be performed, the process proceeds to Step S2. Meanwhile, when the stopping operation of the vehicle is determined to be not performed, the process stands by at Step S1. The determination method of whether or not the stopping operation of the vehicle has been performed is not limited to the above-described example, and whether the stopping operation of the vehicle has been performed or not may be determined using another method. Whether the state of the vehicle is in a state where the change process of the program is executable or not may be determined based on another operation of the occupant or the vehicle state not limiting to the stopping operation of the vehicle.

In Step S2, the vehicle controller 12 determines whether a program change request has been input or not. For example, the program change request is input to the vehicle controller 12 from a server disposed outside the vehicle via the in-vehicle network. When the change request is input to the vehicle controller 12, the process proceeds to Step S3. When the change request is not input to the vehicle controller 12, the process proceeds to Step S7.

When the program change request is input in Step S2, the process proceeds to Step S3. In Step S3, the vehicle controller 12 determines whether the program as a target of the change request input in Step S2 is a program for controlling the high power equipment or not. In this embodiment, the high power equipment is equipment that can be operated by the voltage of the battery 2. For example, the inverter 41 illustrated in FIG. 1 is the high power equipment. When the target program of the change request is determined to be a program for controlling the high power equipment, the process proceeds to Step S4. Meanwhile, when the target program of the change request is determined to be a program for controlling equipment other than the high power equipment, the process proceeds to Step S8.

When the target program of the change request is determined to be a program for controlling the high power equipment in Step S3, the process proceeds to Step S4. In Step S4, the vehicle controller 12 executes a turn-off process of the relay 3. For example, the vehicle controller 12 outputs a control signal for turning off the relay 3 to the relay 3. Thus, the relay 3 switches from the on-state to the off-state, and the battery 2 and the power converter 4 switch from the connected state to the disconnected state. The battery 2 and the DC-DC converter 7 also switch from the connected state to the disconnected state. By the process of this step, it can be avoided that the voltage of the battery 2 is input to the power converter 4.

In Step S5, the vehicle controller 12 executes a discharge process for discharging the electric charge accumulated in the capacitor 43. For example, the vehicle controller 12 outputs a command to turn on the switching element 47 to the motor controller 9. The switching element 47 is turned on by a control signal input from the motor controller 9. Thus, the electric charge accumulated in the capacitor 43 flows to the discharge resistor 46, and the discharge resistor 46 consumes an energy of the electric charge.

In Step S5, the vehicle controller 12 may perform a process for confirming whether the discharge of the capacitor 43 has been completed or not after executing the discharge process. For example, the vehicle controller 12 causes the switching element 47 to continue to be on for a predetermined time period. Then, the vehicle controller 12 may determine whether the discharge of the capacitor 43 has been completed or not based on the voltage between both terminals of the capacitor 43 detected by the voltage sensor 44. For the method for determining whether the discharge of the capacitor 43 has been completed or not, a determination method known at the time of the filing of this application is applicable to the vehicle controller 12. When it is determined that the discharge of the capacitor 43 has not been completed, the vehicle controller 12 may further cause the switching element 47 to continue to be on for a predetermined time period, and then may determine whether the discharge has been completed or not again.

In Step S6, the vehicle controller 12 executes a change process of a program for controlling the high power equipment. In the example of FIG. 1, the vehicle controller 12 executes the program change process on the program stored in the ROM of the motor controller 9. When the program stored in the ROM of the motor controller 9 is changed, the process proceeds to Step S7.

In Step S7, the vehicle controller 12 executes a sleep process of the vehicle. For example, the vehicle controller 12 execute the sleep process in accordance with the program changed in Step S6, thereby turning off each of the switching elements of the inverter 41. For example, the vehicle controller 12 turns off the switching element 47 that has been tuned on in Step S5. When the process of this step ends, the vehicle transitions to what is called a sleep state. When the process in Step S7 ends, the vehicle controller 12 ends the process illustrated in FIG. 2.

When the target program of the change request is determined to be a program for controlling equipment other than the high power equipment in Step S3, the process proceeds to Step S8. In Step S8, the vehicle controller 12 executes a change process of a program for controlling the low power equipment. In the example of FIG. 1, the vehicle controller 12 executes the program change process on the program stored in the ROM of the auxiliary machine controller 10. When the program stored in the ROM of the auxiliary machine controller 10 is changed, the process proceeds to Step S9.

In Step S9, the vehicle controller 12 executes a turn-off process of the relay 3. This step corresponds to Step S3. As a specific example of the turn-off process of the relay 3, the explanation of Step S3 is employed. When the process in Step S9 ends, the process proceeds to Step S7, and the vehicle controller 12 executes the sleep process of the vehicle.

In the flowchart illustrated in FIG. 2, the timing at which the changed program is input to the vehicle controller 12 is not specifically limited. For example, the changed program of the motor controller 9 or the auxiliary machine controller 10 may be input to the vehicle controller 12 in Step S2. For example, the changed program of the motor controller 9 or the auxiliary machine controller 10 may be input to the vehicle controller 12 in Step 6.

Here, the state of the motor controller 9 and the power converter 4 during changing the program of the motor controller 9 will be described. For example, for reducing the stationarily flowing current, when a pull-up resistor or a pull-down resistor is not disposed to an output terminal of the motor controller 9, the output terminal of the motor controller 9 becomes inconstant state during the execution of the program change process of the motor controller 9. Since an indefinite signal is input to the gate driving circuit 42 from the motor controller 9, the gate driving circuit 42 outputs a control signal of the indefinite state to the inverter 41 or the discharge circuit 45. Due to the control signal of the indefinite state, an originally unexpected behavior possibly occurs in the inverter 41 or the discharge circuit 45. For example, an upper switching element and a lower switching element constituting the arm circuit of the inverter 41 simultaneously turn on, and thus a flow-through current possibly flows in the inverter 41 during the program change process. Alternatively, for example, the switching element 47 of the discharge circuit 45 turns on, and thus the current possibly continues flowing in the discharge resistor 46 during the program change process.

The power source system 100 according to this embodiment includes the battery 2, the inverter 41 operated by the electric power supplied from the battery 2, the motor controller 9 that controls the operation of the inverter 41 in accordance with the program, the auxiliary battery 8 connected to the battery 2 via the DC-DC converter 7, the auxiliary machine 11 operated by the electric power supplied from the auxiliary battery 8, the auxiliary machine controller 10 that controls the operation of the auxiliary machine 11 in accordance with the program, the relay 3 that connects or disconnects between the battery 2 and the inverter 41, and the vehicle controller 12 that controls the relay 3. When the program of the motor controller 9 is changed, the vehicle controller 12 disconnects the battery 2 from the inverter 41 by the relay 3 before the program change process of the motor controller 9 is started. Accordingly, it can be suppressed that an unanticipated behavior occurs in the inverter 41 as a control target of the program during the rewrite of the program of the motor controller 9. For example, even when the output terminal of the motor controller 9 is in the indefinite state during the program change process of the motor controller 9, the voltage of the battery 2 is not applied to the inverter 41, and therefore, it can be avoided that the flow-through current flows in the inverter 41.

In this embodiment, the power source system 100 includes the capacitor 43 that smooths the output voltage of the battery 2, and the discharge circuit 45 that discharges the electric charge accumulated in the capacitor 43. The relay 3 is disposed between the battery 2 and the capacitor 43. The vehicle controller 12 causes the discharge circuit 45 to discharge the electric charge accumulated in the capacitor 43 in the state where the battery 2 is disconnected from the inverter 41. Accordingly, it can be avoided that the electric charge accumulated in the capacitor 43 flows into the inverter 41 during the program change process of the motor controller 9. Consequently, even when the output terminal of the motor controller 9 is in the indefinite state during the program change process of the motor controller 9, it can be avoided that the flow-through current flows in the inverter 41. Since the electric charge can be discharged more quickly than the case of natural discharge, the program change process of the motor controller 9 can be executed more quickly than the case of natural discharge. Consequently, since a time period in which the relay 3 is turned off, that is, a time period in which the auxiliary battery 8 cannot be charged can be shortened, size reduction of the auxiliary battery 8 can be attempted.

Furthermore, in this embodiment, when the program of the auxiliary machine controller 10 is changed, the vehicle controller 12 disconnects the battery 2 from the inverter 41 by the relay 3 after the program change process of the auxiliary machine controller 10 ends. Accordingly, since the auxiliary battery 8 can be charged by the DC-DC converter 7 during the program change process of the auxiliary machine controller 10, the reduction of the power supply voltage of the auxiliary machine controller 10 can be suppressed. Consequently, an abnormal end of the program change process of the auxiliary machine controller 10 due to the reduction of the power supply voltage can be suppressed. Additionally, it can be suppressed that the auxiliary battery 8 excessively discharges the electric charge to the auxiliary machine controller 10 and the auxiliary battery 8 becomes a state of excessive discharge during the program change process of the auxiliary machine controller 10.

Second Embodiment

Figure 3:
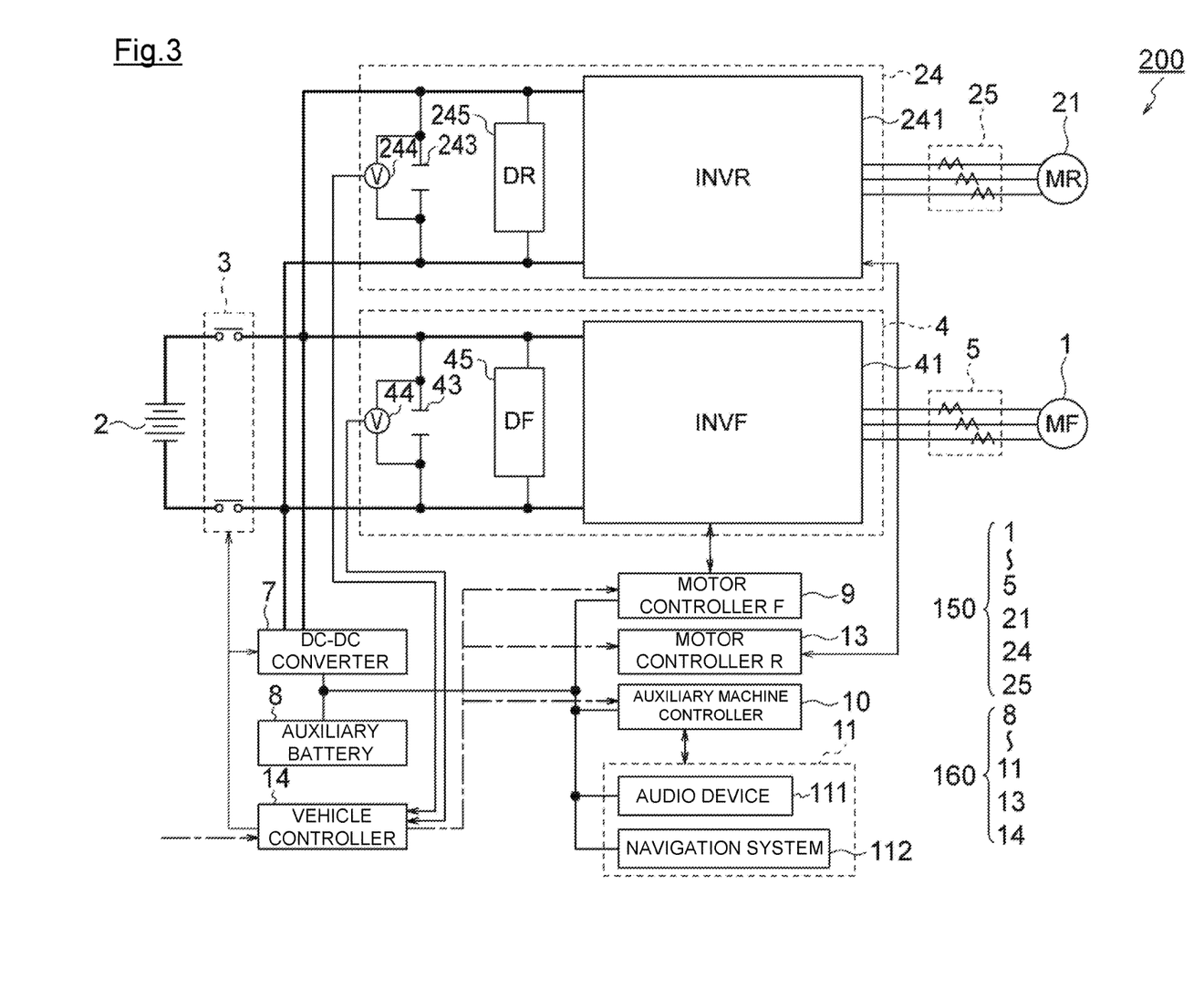
FIG. 3 is a block diagram of a power source system according to a second embodiment.

Next, a power source system 100 according to the second embodiment will be described with reference to FIG. 3. FIG. 3 is a block diagram of the power source system 200 according to the second embodiment. A power source system 200 is mounted in an electric-powered vehicle similarly to the power source system 100 according to the first embodiment. In the second embodiment, the driving method of the electric-powered vehicle is different from the driving method of the electric-powered vehicle of the first embodiment. The electric-powered vehicle of this embodiment is a four-wheel drive vehicle. The electric-powered vehicle includes a motor 1 for driving front wheels and a motor 21 for driving rear wheels.

As illustrated in FIG. 3, the power source system 200 includes two types of electric power systems different in height of voltage. A high-voltage electric power system 150 includes a motor 1, a battery 2, a relay 3, a power converter 4, and a current sensor 5, which are described in the first embodiment, and additionally, a motor 21, a power converter 24, and a current sensor 25. Reference numerals similar to those in FIG. 1 are attached to configurations similar to those in the first embodiment, and the explanation in the first embodiment is employed for the explanation of each configuration.

Since the motor 21, the power converter 24, and the current sensor 25 illustrated in FIG. 3 correspond to the motor 1, the power converter 4, and the current sensor 5, the explanation in the first embodiment is employed for these configurations. Although omitted in FIG. 3, the power converter 24 includes an inverter 241, a capacitor 243, a voltage sensor 244, and a discharge circuit 245. Since the configurations of the power converter 24 correspond to the respective configurations of the power converter 4, the explanation in the first embodiment is employed for these configurations. As illustrated in FIG. 3, in this embodiment, the power converter 4 and the power converter 24 are connected in parallel to the battery 2 via the relay 3.

Next, a low-voltage electric power system 160 according to the second embodiment will be described. Since the low-voltage electric power system 160 according to the second embodiment is similar to the low-voltage electric power system 60 according to the first embodiment except that a motor controller 13 is disposed and a part of the functions of a vehicle controller 14 is different from the vehicle controller 12 according to the first embodiment, the explanation in the first embodiment is employed for the configurations similar to those in the first embodiment.

The motor controller 13 is a computer for controlling the operation of the motor 21. Similarly to the motor controller 9, the motor controller 13 executes a program stored in the ROM, thereby controlling the inverter 241. The program stored in the ROM of the motor controller 13 is changed by the vehicle controller 14 described later.

Similarly to the vehicle controller 12 according to the first embodiment, the vehicle controller 14 according to this embodiment has a converter control function, a relay control function, a discharge control function, and a program change function. In the description below, control different from that of the vehicle controller 12 according to the first embodiment will be described, and the explanation in the first embodiment is employed for control similar to that of the vehicle controller 12.

Figure 4:
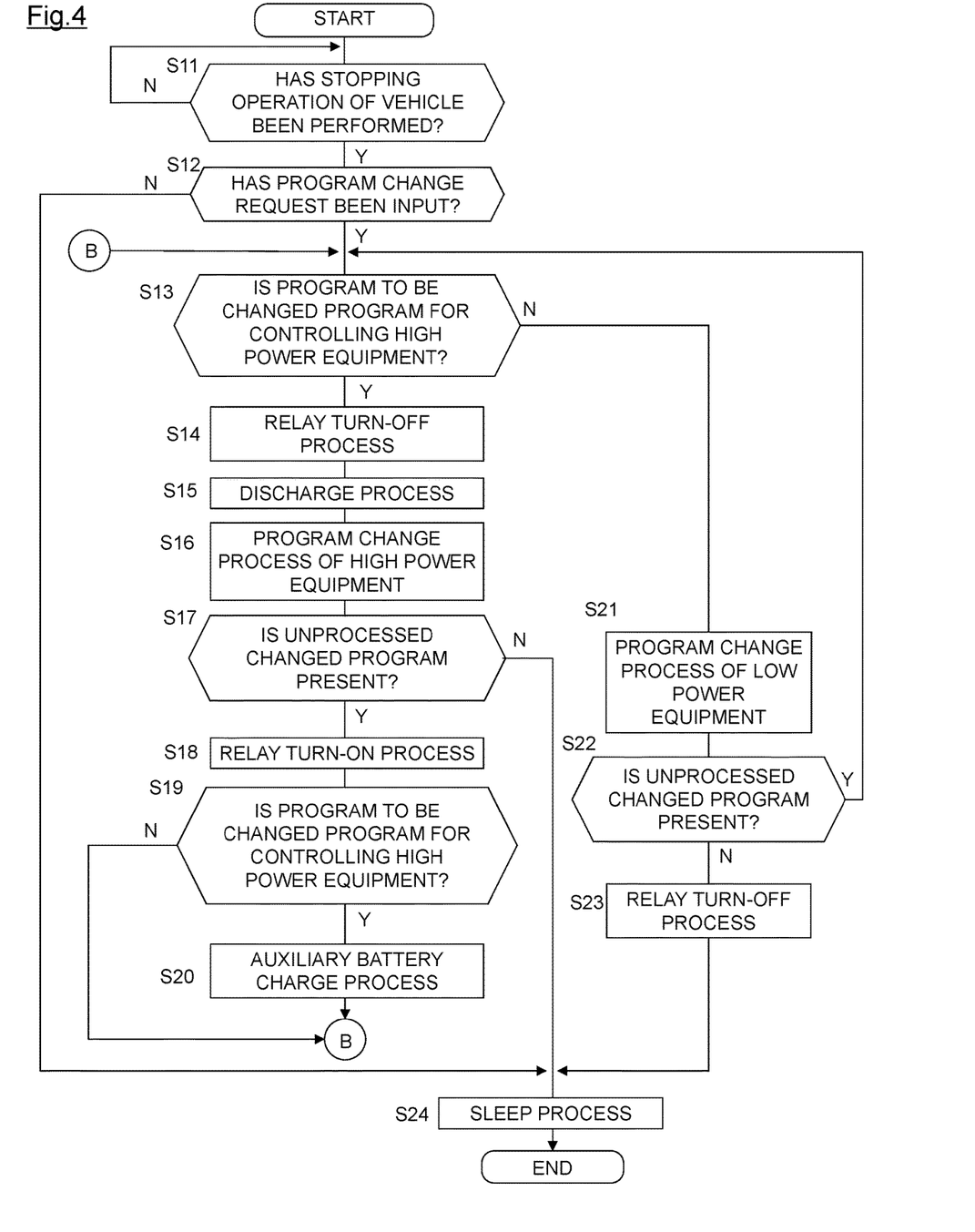
FIG. 4 is a flowchart illustrating a control process executed by a vehicle controller in the power source system according to the second embodiment.

Next, the control executed by the vehicle controller 14 will be described with reference to FIG. 4. FIG. 4 is a flowchart illustrating a control process executed by the vehicle controller 14 in the power source system 200. The process illustrated in FIG. 4 is executed by the vehicle controller 14. In a state of the power source system 200 before the start of Step S11 illustrated in FIG. 4, it is assumed that the relay 3 is on, and the switching element 47 of the discharge circuit 45 and a switching element 247 (not illustrated) of the discharge circuit 245 are off.

Step S11 and Step S12 correspond to Step S1 and Step S2 illustrated in FIG. 2, respectively. Therefore, the explanation in the first embodiment is employed for the explanation of each step. When a change request is input to the vehicle controller 14, the process proceeds to Step S13. When the change request is not input to the vehicle controller 14, the process proceeds to Step S24.

When the program change request is input in Step S12, the process proceeds to Step S13. In Step S13, the vehicle controller 14 determines whether the program as a target of the change request input in Step S12 is a program for controlling the high power equipment or not. In this embodiment, different from the first embodiment, two devices of the inverter 41 and the inverter 241 are the high power equipment. When the target program of the change request is determined to be a program for controlling the high power equipment, the process proceeds to Step S14. Meanwhile, when the target program of the change request is determined to be a program for controlling equipment other than the high power equipment, the process proceeds to Step S21.

When the target program of the change request is determined to be a program for controlling the high power equipment in Step S13, the process proceeds to Step S14. Step S14 to Step S16 correspond to Step S4 to Step S6 illustrated in FIG. 2. Therefore, the explanation in the first embodiment is employed for the explanation of these steps.

In this embodiment, the vehicle controller 14 determines whether the program to be changed in Step S13 is a program for controlling the operation of any motor of the motor 1 or the motor 21 or not. When the program is determined to be a program for controlling the operation of the motor 1, the vehicle controller 14 outputs a command for turning on the switching element 47 to the motor controller 9 in Step S15. The vehicle controller 14 executes a program change process on the program stored in the ROM of the motor controller 9 in Step S16. Meanwhile, when the program is determined to be a program for controlling the operation of the motor 21, the vehicle controller 14 outputs a command for turning on the switching element 247 to the motor controller 13 in Step S15. The vehicle controller 14 executes a program change process on the program stored in the ROM of the motor controller 13 in Step S16.

In Step S17, the vehicle controller 14 determines whether an unprocessed changed program is present or not. The unprocessed changed program is a program to which the change process has not been performed. For example, when the program change request input in Step S3 includes the change requests to the programs of a plurality of controllers, the vehicle controller 14 determines whether the unprocessed changed program is present or not based on the number of times of the execution of Step S16. For example, when the number of times of the execution of Step S16 is smaller than the number of programs to which the change is requested, it is determined that the unprocessed changed program is present. Meanwhile, for example, when the number of times of the execution of Step S16 is the same as the number of programs to which the change is requested, it is determined that the unprocessed changed program is not present. When the unprocessed changed program is determined to be present, the process proceeds to Step S18. Meanwhile, when the unprocessed changed program is determined to be not present, the process proceeds to Step S24.

When the unprocessed changed program is determined to be present in Step S17, the process proceeds to Step S18. In Step S18, the vehicle controller 14 executes a turn-on process of the relay 3. For example, the vehicle controller 14 outputs a control signal for turning on the relay 3 to the relay 3. Thus, the relay 3 switches from the off-state to the on-state, and the battery 2 and the DC-DC converter 7 switch from the disconnected state to the connected state. By the process of this step, the voltage of the battery 2 is input to the DC-DC converter 7. Charging the auxiliary battery 8 can be started.

In Step S19, the vehicle controller 14 executes a charge process of the auxiliary battery 8. For example, the vehicle controller 14 outputs a control signal for stepping down the voltage of the battery 2 to the DC-DC converter 7. Thus, the voltage is input to the auxiliary battery 8 from the DC-DC converter 7, and the auxiliary battery 8 is charged. In Step S16, since the relay 3 is in the off-state, the auxiliary battery 8 discharges the electric charge for supplying the electric power to the motor controller 9 or the motor controller 13 while the program change process is performed. Therefore, when the process of Step S16 ends, the charge amount of the auxiliary battery 8 is reduced compared with the charge amount before starting the process of Step S16. By the process of this step, the electric power reduced in the auxiliary battery 8 can be compensated. In other words, in Step S19, the vehicle controller 14 executes a process of auxiliary charge to the auxiliary battery 8.

In Step S19, the vehicle controller 14 may perform a process of measuring the charge amount of the auxiliary battery 8 after executing the process of auxiliary charge. For example, the vehicle controller 14 measures the charge amount of the auxiliary battery 8 based on detection results from a current sensor and a voltage sensor disposed in the auxiliary battery 8. For the method for measuring the charge amount of the auxiliary battery 8, a determination method known at the time of the filing of this application is applicable to the vehicle controller 14. When the process of Step S19 ends, the process returns to Step S13. For example, when the programs of the motor controller 9 and the motor controller 13 are the targets of the change request, the process proceeds to Step S16 again, and the programs are changed.

When the target program of the change request is determined to be the program for controlling equipment other than the high power equipment in Step S13, the process proceeds to Step S21. In Step S21, the vehicle controller 14 executes the program change process for controlling the low power equipment. This step corresponds to Step S8 illustrated in FIG. 2.

In Step S22, the vehicle controller 14 determines whether an unprocessed changed program is present or not. This step corresponds to Step S17. When the unprocessed changed program is determined to be present, the process returns to Step S13. Meanwhile, when the unprocessed changed program is determined to be not present, the process proceeds to Step S23.

In Step S23, the vehicle controller 14 executes a turn-off process of the relay 3. This step corresponds to Step S9 illustrated in FIG. 2. For specific example of the turn-off process of the relay 3, the explanation in the first embodiment is employed. When the process of Step S23 ends, the process proceeds to Step S24.

When the program change request is determined to be not input in Step S2, when the unprocessed changed program is determined to be not present in Step S17, or when the process of Step S22 ends, the process proceeds to Step S24. In Step S24, the vehicle controller 14 executes a sleep process of the vehicle. This step corresponds to Step S7 illustrated in FIG. 2. When the process of Step S23 ends, the vehicle controller 14 ends the process illustrated in FIG. 4.

As described above, the power source system 200 according to this embodiment includes a plurality of pieces of high power equipment of the inverter 41 and the inverter 241, and a motor controller 31 that controls the operation of the inverter 41 and a motor controller 131 that controls the operation of the inverter 241. In this embodiment, when the program of the motor controller 31 and the program of the motor controller 131 are sequentially changed, the vehicle controller 14 connects between the battery 2 and the DC-DC converter 7 by the relay 3 for a period from the end of the one program change process to the start of the next program change process. Accordingly, since the auxiliary battery 8 can be charged before the start of the program change process, an abnormal end of the program change process due to the reduction of the power supply voltage can be suppressed. Additionally, it can be suppressed that the auxiliary battery 8 excessively discharges the electric charge to the motor controller 9 or the motor controller 13 and the auxiliary battery 8 becomes a state of excessive discharge during the program change process. Furthermore, since the capacity of the auxiliary battery 8 can be decreased as much as possible, size reduction of the auxiliary battery 8 can be attempted.

The embodiments described above are described for ease of understanding the present invention, and not described to limit the present invention. Accordingly, the components disclosed in the above-described embodiments are each intended to include all the changes of design and equivalents within the technical scope of the present invention.

For example, for the state of the relay 3 before starting Step S1 illustrated in FIG. 2 and Step S11 illustrated in FIG. 4, while the state where the relay 3 is on is described, the vehicle controller may execute a process of turning on the relay. For example, in Step S8 illustrated in FIG. 2, the vehicle controller 12 may connect between the battery 2 and the inverter 41 by the relay 3 before the start of the program change process of the auxiliary machine controller 10. Accordingly, since the auxiliary battery 8 can be charged by the DC-DC converter 7 even during the program change process, the reduction of the power supply voltage of the auxiliary machine controller 10 can be suppressed. Consequently, an abnormal end of the program change process of the auxiliary machine controller 10 due to the reduction of the power supply voltage can be suppressed. Additionally, it can be suppressed that the auxiliary battery 8 excessively discharges the electric charge to the auxiliary machine controller 10 and the auxiliary battery 8 becomes a state of excessive discharge during the program change process of the auxiliary machine controller 10.

While an exemplary configuration in which the power converter includes a discharge circuit is described in the above-described embodiments, the power converter is not limited to including the discharge circuit. The vehicle controller may discharge the electric charge accumulated in the capacitor by other than the discharge circuit. For example, the vehicle controller may control each switching element of the inverter to flow the electric charge accumulated in the capacitor to a wound wire of the motor. For the technique of discharge using the wound wire of the motor, a technique known at the time of the filing of this application is applicable to the vehicle controller.

While an exemplary configuration in which the vehicle controller 12 or the vehicle controller 14 has a plurality of functions is described in the above-described embodiment, the functions of the vehicle controller 12 or the vehicle controller 14 may be configured by a plurality of controllers. For example, the power source system may have a configuration that includes a converter controller with a converter control function, a relay controller with a relay control function, a discharge controller with a discharge control function, and a program controller with a program change function. While the controller that controls the operation of the motor 1 is referred to as the motor controller 9 in the description of the above-described first embodiment, since the operation control of the motor 1 is performed by the operation control of the inverter 41, the controller that controls the operation of the motor 1 may be referred to as an "inverter controller 9."

While an exemplary configuration in which the auxiliary battery 8 drives each controller is described in the above-described embodiments, the auxiliary battery 8 only needs to be a driving power supply of the auxiliary machine 11, and driving power supplies of the respective controllers may be batteries different from the auxiliary battery 8.

DESCRIPTION OF REFERENCE SIGNS

1 . . . motor
2 . . . battery
3 . . . relay
4 . . . power converter
41 . . . inverter
42 . . . gate driving circuit
43 . . . capacitor
44 . . . voltage sensor
45 . . . discharge circuit
5 . . . current sensor
6a, 6b . . . power supply bus
7 . . . DC-DC converter
8 . . . auxiliary battery
9 . . . motor controller
10 . . . auxiliary machine controller
11 . . . auxiliary machine
111 . . . audio device
112 . . . navigation system
12 . . . vehicle controller

The invention claimed is:

1. A power source system mounted in a vehicle, the power source system comprising:
    a first power source;
    a first load configured to be operated by electric power supplied from the first power source;
    a first controller configured to control an operation of the first load using a first program;
    a second power source connected to the first power source via a converter;
    a second load configured to be operated by electric power supplied from the second power source;
    a second controller configured to control an operation of the second load using a second program;
    an electric power disconnecting device configured to connect and disconnect the first power source and the first load;
    a third controller that controls configured to control the electric power disconnecting device;
    a capacitor configured to smooth an output voltage of the first power source; and
    a discharge circuit configured to discharge an electric charge accumulated in the capacitor, wherein:
    the third controller is configured to, upon receiving a request to change the first program, before the first program is changed:
        disconnect the first power source from the first load using the electric power disconnecting device, and
        after the first power source is disconnected from the first load, discharge the electric charge accumulated in the capacitor using the discharge circuit.

2. The power source system according to claim 1, wherein:
    the third controller is configured to, upon receiving a request to change the second program, before the second program is changed, connect the first power source and the first load using the electric power disconnecting device.

3. The power source system according to claim 2, wherein:
    the third controller is configured to, after the second program is changed, disconnect the first power source from the first load and the converter using the electric power disconnecting device.

4. A power source system mounted in a vehicle, the power source system comprising:
    a first power source;
    a plurality of first loads configured to be operated by electric power supplied from the first power source;
    a first controller comprising a plurality of first controllers configured to control respective operations of the plurality of first loads by a respective plurality of first programs;
    a second power source connected to the first power source via a converter;
    a second load configured to be operated by electric power supplied from the second power source;
    a second controller configured to control an operation of the second load using a second program;
    an electric power disconnecting device configured to connect and disconnect the first power source and the plurality of first loads; and
    a third controller configured to control the electric power disconnecting device;
    wherein:

the electric power disconnecting device is configured to connect and disconnect the first power source and the converter, the plurality of first loads and the converter are connected to the first power source in parallel via the electric power disconnecting device, and the third controller is configured to, upon receiving a request to sequentially change the plurality of first programs:

before a first of the plurality of first programs is changed, disconnect the first power source from the plurality of first loads using the electric power disconnecting device;

after the first of the plurality of first programs is changed, connect the first power source and the converter using the electric power disconnecting device, and before a second of the plurality of first programs is changed, disconnect the first power source from the converter using the electric power disconnecting device.

5. A power source system control method for controlling a power source system mounted in a vehicle, wherein:

the power source system includes:

a first power source;

a first load configured to be operated by electric power supplied from the first power source;

a first controller configured to control an operation of the first load using a first program;

a second power source connected to the first power source via a converter;

a second load configured to be operated by electric power supplied from the second power source;

a second controller configured to control an operation of the second load using a second program;

an electric power disconnecting device configured to connect and disconnect the first power source and the first load;

a third controller that controls configured to control the electric power disconnecting device;

a capacitor configured to smooth an output voltage of the first power source; and a discharge circuit configured to discharge an electric charge accumulated in the capacitor; and upon receiving a request to change the first program, before the first program is changed, the method comprises;

disconnecting the first power source from the first load using the electric power disconnecting device; and after the first power source is disconnected from the first load, discharging the electric charge accumulated in the capacitor using the discharge circuit.

\* \* \* \* \*